April 1, 1924.
W. C. HAGEN ET AL
1,488,813
RELIEF VALVE FOR PNEUMATIC TIRES
Filed Jan. 7, 1922
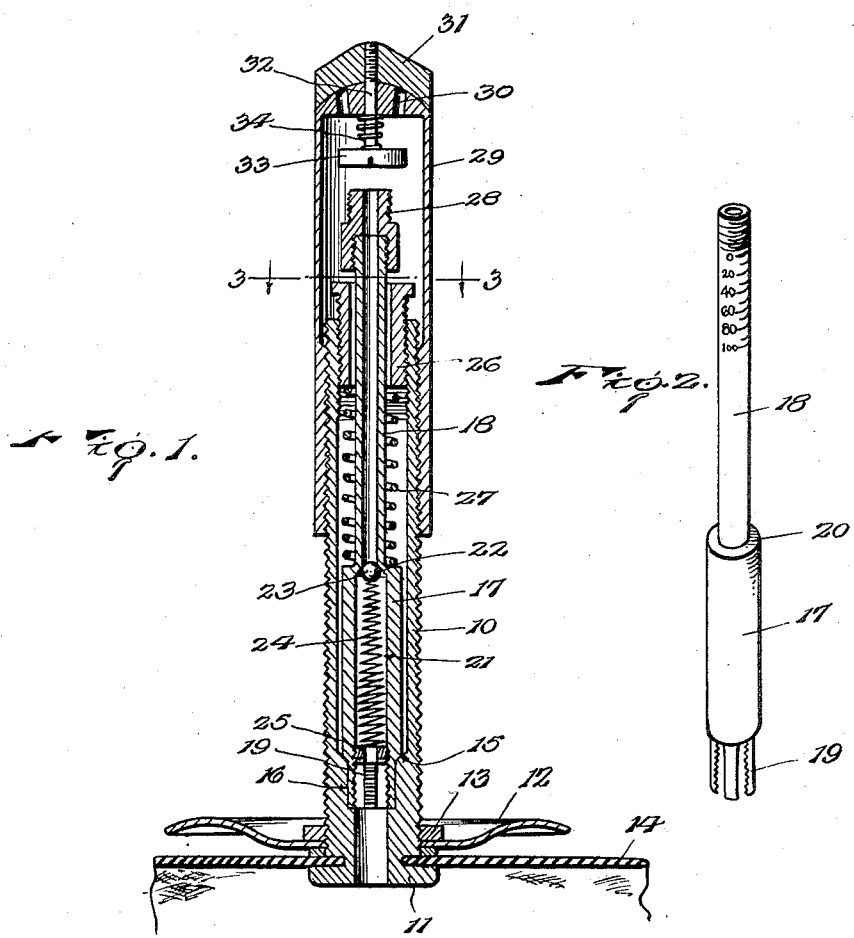
Inventors.
W. C. Hagen.
R. A. Haas.
By Lacey & Lacey, Attorneys Patented Apr. 1, 1924.

UNITED STATES PATENT OFFICE.

WILLIAM C. HAGEN AND RALPH A. HAAS, OF MARION, OHIO.

RELIEF VALVE FOR PNEUMATIC TIRES.

Application filed January 7, 1922. Serial No. 527,691.

*To all whom it may concern:*

Be it known that we, WILLIAM C. HAGEN and RALPH A. HAAS, citizens of the United States, residing at Marion, in the county of Marion and State of Ohio, have invented certain new and useful Improvements in Relief Valves for Pneumatic Tires, of which the following is a specification.

This invention relates to an improved relief valve for pneumatic tires and has as one of its principal objects to provide a device of this character which, when a tire becomes heated and the air therein is caused to expand, as invariably occurs when the tire is subjected to hard usage or when traveling on a hot day will automatically operate to prevent blow-out of the tire.

A further object of the invention is to provide a valve which, after the air in the tire reaches a certain pressure, will prevent a further rise of pressure in the tire by permitting air to escape therefrom.

And the invention has as a still further object to provide a valve which may be adjusted to open at practically any pressure desired within ordinary limits.

Other and incidental objects will appear hereinafter.

In the drawing:

Figure 1 is an enlarged vertical sectional view of my improved device.

Figure 2 is a detail perspective view of the escape valve of the device.

Figure 3 is a transverse section on the line 3—3 of Figure 1, looking in the direction of the arrows, and Figure 4 is a top plan view of the cap employed, the valve of the cap being removed.

In carrying the invention into effect, I employ a tubular casing 10 externally threaded throughout its length and provided at its lower end with a head 11. Freely fitting over the casing to coact with the head is the usual plate 12 held by a nut 13 for connecting the casing with a tube, as conventionally illustrated at 14. Formed in the casing near its lower end is a beveled valve seat 15 below which the casing is counterbored as indicated at 16. Loosely fitting in the casing is an escape valve comprising a cylindrical body or barrel 17 from the upper end of which projects a reduced stem 18. At its lower end, the body is beveled to cooperate with the seat 15 of the casing and extending from the lower end of the valve body is a plurality of spaced spring guide fingers 19 snugly but slidably fitting in the counterbore 16 of the casing. At its upper end, the valve body provides a shoulder 20 and, as will now be observed, the valve body is internally recessed to provide a valve chamber 21 at the upper end of which is a valve seat 22 lying substantially in a plane with said shoulder. Cooperating with the seat 22 is a ball check valve 23 normally held closed by a spring 24 and sustaining said spring is a tubular plug 25 threaded into the valve chamber 21 at its lower end, the confronting faces of the fingers 19 being threaded to accommodate the plug. The valve stem 18 extends above the upper end of the casing 10 and threaded into the casing to loosely surround said stem is a sleeve 26 providing a guide centering the stem with respect to the casing. As shown in detail in Figure 3, the sleeve 26 is preferably provided with a square opening therethrough so that air may flow through the sleeve around the stem 18. Bearing between the inner end of the sleeve and the shoulder 20 of the escape valve is a spring 27 normally holding the valve closed in engagement with the seat 15. Threaded upon the upper end of the stem is a nipple 28 to which a hose coupling may be attached for inflating the tube 14, the check valve 23 being adapted, of course, to prevent escape of air through the escape valve.

Threaded over the valve casing 10 is a dust cap 29 having a thickened end wall which is preferably formed with a rounded outer face and formed through said wall is, as shown in Figure 4, a plurality of air passages 30. Overlying the wall is a valve 31 cupped at its inner side to seat flat against the rounded face of the wall and threaded through the valve is a stem 32 slidably fitting through said wall. The stem is provided with a head 33 and bearing between said head and the end wall of the cap is a spring 34 normally holding the valve closed. Thus, the valve will prevent the entrance of dust or dirt through the passages 30.

As will now be readily understood in view of the preceding description, when the air pressure in the tube 14 rises sufficiently, the escape valve will be lifted against the tension of the spring 27 when air will be permitted to escape past the valve to discharge through the sleeve 26 into the cap. The air pressure in the cap will then serve to lift the valve 31 so that the air will be permitted to finally escape through the passages 30. Thus, the valve will automatically operate to prevent excess air pressure in the tube 14. By adjusting the sleeve 26, the tension of the spring 27 against the escape valve may be readily varied so that the pressure at which the escape valve will open may accordingly be easily regulated. Should it be desired to cause the valve 31 to stand open, the cap 29 may simply be adjusted upon the casing 10 until the head 33 of the stem of said valve abuts the nipple 28, thereby causing the spring 34 to be compressed and the valve to be held away from the end wall of the cap. Air escaping past the escape valve may then flow unchecked through the passages 30. After the valve 31 has been opened, the cap 29 may then be further adjusted upon the casing 10 for binding the escape valve closed. Thus, when desired, the escape valve may be easily rendered inoperative. Preferably, the stem 18 of the escape valve is graduated, as suggested in the drawing, so that the air pressure carried in the tire may be readily ascertained.

Having thus described the invention, what is claimed as new is:

In a tire valve, the combination of a tubular casing provided with an interval valve seat, an outwardly opening tubular escape valve enlarged for a portion of its length to form a check valve receiving barrel engageable at its inner end with said seat and defining an external shoulder at its outer end, the barrel terminating in a plurality of spring fingers frictionally coacting with the bore of the casing below said seat and threaded at their inner sides to accommodate a plug for retaining a check valve in the barrel, and a spring bearing against said shoulder normally retaining the escape valve closed.

In testimony whereof we affix our signatures.

WILLIAM C. HAGEN. [L. S.]
RALPH A. HAAS. [L. S.]